US009256697B2

(12) United States Patent
Jiang et al.

(10) Patent No.: US 9,256,697 B2
(45) Date of Patent: Feb. 9, 2016

(54) BIDIRECTIONAL MAPPING BETWEEN APPLICATIONS AND NETWORK CONTENT

(75) Inventors: Zhaowei Charlie Jiang, Palo Alto, CA (US); Steven William Macbeth, Redmond, WA (US); Syed Muhammad Mujahid Hasan, Bellevue, WA (US); Jacob Sabulsky, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 727 days.

(21) Appl. No.: 13/470,236

(22) Filed: May 11, 2012

(65) Prior Publication Data

US 2013/0304729 A1     Nov. 14, 2013

(51) Int. Cl.
*G06F 17/30*     (2006.01)
*G06F 7/00*     (2006.01)

(52) U.S. Cl.
CPC ................ *G06F 17/30905* (2013.01)

(58) Field of Classification Search
CPC ............................ G06F 17/30905
See application file for complete search history.

(56) References Cited

U.S. PATENT DOCUMENTS

| 7,797,450 | B2 | 9/2010 | Xie et al. |
| 2002/0078095 | A1 | 6/2002 | Culham |
| 2004/0006653 | A1 | 1/2004 | Kamen et al. |
| 2008/0244509 | A1 | 10/2008 | Buchs et al. |

OTHER PUBLICATIONS

"How to Put the Link on Market App from a Web Page", Retrieved at <<http://bees4honey.com/blog/tutorial/how-to-put-the-link-on-market-app-from-a-web-page/>>, Retrieved Date: Feb. 23, 2012, pp. 7.

"Make your website an iPhone web application", Retrieved at <<http://www.luscarpa.com/development/make-your-website-an-iphone-web-application/>>, Feb. 23, 2010, pp. 16.

Link to App Store From Your Site, Retrieved at <<http://shaunmackey.com/articles/mobile/link-to-app-store-from-your-site/>>, Nov. 12, 2010, p. 1.

*Primary Examiner* — Jeffrey A Burke
(74) *Attorney, Agent, or Firm* — Steven Spellman; Tom Wong; Micky Minhas

(57) ABSTRACT

A bidirectional mapping is established between network content and application programs, based on declarations at both the network content and at the application. Additionally, bidirectional mapping can provide for deep links, which can associate specific network content with a specific presentation of data in an application program. The identification format for such deep links can conform to a predetermined standard or it can be custom implemented according to a format declared either as part of the network content or the application program. The bidirectional mapping is then utilized by a lookup service to provide functionality to a third-party entity. The lookup service can identify, to the entity, application programs associated with network content specified by that entity and network content associated with application programs specified by that entity.

20 Claims, 5 Drawing Sheets

BIDIRECTIONAL MAPPING BETWEEN APPLICATIONS AND NETWORK CONTENT

BACKGROUND

Traditionally, computing devices have executed computer-executable instructions that were packaged in the form of application programs to access computer readable data packaged in the form of separate data files that could be created, edited and read by the application programs. The data, or content, that was created, edited and read by the application programs was conceptualized independently from the application programs themselves. For example, one user would utilize an application program to create a data file, and such a data file could then be provided to a second user who could, independently, utilize another copy of the same, or compatible, application program to read and edit the data file created by the first user.

With the advent and increasing prevalence of network communications, the exchange of data became more efficient and more widely utilized. Network browser application programs were developed that could read multimedia and hypermedia data which could then be made available to many individuals simultaneously through networked server computing devices. To enable users to find, and subsequently access, data relevant to their interests, network search mechanisms were developed that could parse the data available on one or more networks and direct users to those data files that were relevant to those users' interests.

As computing devices became more varied in their hardware capabilities, the presentation of data became intermingled with the computer executable instructions of the application programs that could consume such data. For example, a user utilizing a traditional desktop personal computing device can utilize a network browser and a network search service to locate, as an example, hotels near the user. However, were the user traveling, and sought to perform the same action utilizing a mobile computing device, such as a smart phone or a tablet computing device, the inherent hardware limitations of such a mobile computing device, including the mobile computing device's smaller display and a slower network connection, could render such an action inefficient. Instead, to provide efficiency to users of such mobile computing devices dedicated applications have been developed that can present such a user with analogous information such as, in the above example, hotels near the user. In such instances, the application programs are often nothing more than a repackaging of already available data into a form that is most easily accessed and consumed by users of computing devices comprising inherent hardware limitations such as, for example, the inherent displaying communicational limitations of mobile computing devices.

Unfortunately, the prevalence of application programs, such as for mobile environments, can decrease the utility of existing services and functionality that are not designed to consume such applications and make use of their content. For example, existing network search services have become very efficient at cataloging data available via network communications, and thereby provide useful services to users by enabling those users to find data relevant to their queries. Such existing network search services, however, cannot utilize existing mechanisms to catalog data that is packaged in the form of an application program, nor can they even discover, let alone catalog, data that, while it may be separately available on a network from the application program, is available only through custom, or predefined, network communication channels that only a corresponding application would be aware of and be able to utilize. As another example, users of mobile computing devices can have selected one or more application programs that such users believe are relevant to their needs and interests. However, due to the inherent hardware limitations of such mobile computing devices, it can be difficult for users of such mobile computing devices, utilizing existing network browsing functionality, to find networked sites associated with the one or more application programs that such users are already familiar with.

SUMMARY

In one embodiment, a bidirectional mapping can be established between network content, such as network content organized in the form of websites, and application programs, such as dedicated applications executing on a mobile computing device operating system platform. Such a bidirectional mapping can be based on declarations at both the network content, such as in the form of extensible markup language content or metadata tags, and at the dedicated application, such as in the form of a manifest.

In another embodiment, a bidirectional mapping can be established with deep links, thereby enabling association between specific network content, such as a specific webpage, and a specific presentation of data in an application program, such as a specific screen of the application program. The identification format for such deep links can conform to a predetermined standard, such as by utilizing the same identifier, except with a different protocol specifier, for both the specific network content and the specific presentation of data in the application program. Alternatively, the identification format for such deep links can be custom implemented according to a defined format that can be declared either as part of the network content or as part of the application program.

In a further embodiment, a network-content-to-application mapping service can identify application programs associated with specified network content and network content associated with specified application programs. In such a manner, applications or services that are cognizant only of application programs can learn of associated network content, and applications or services cognizant only of network content can learn of associated application programs.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

Figure 1:
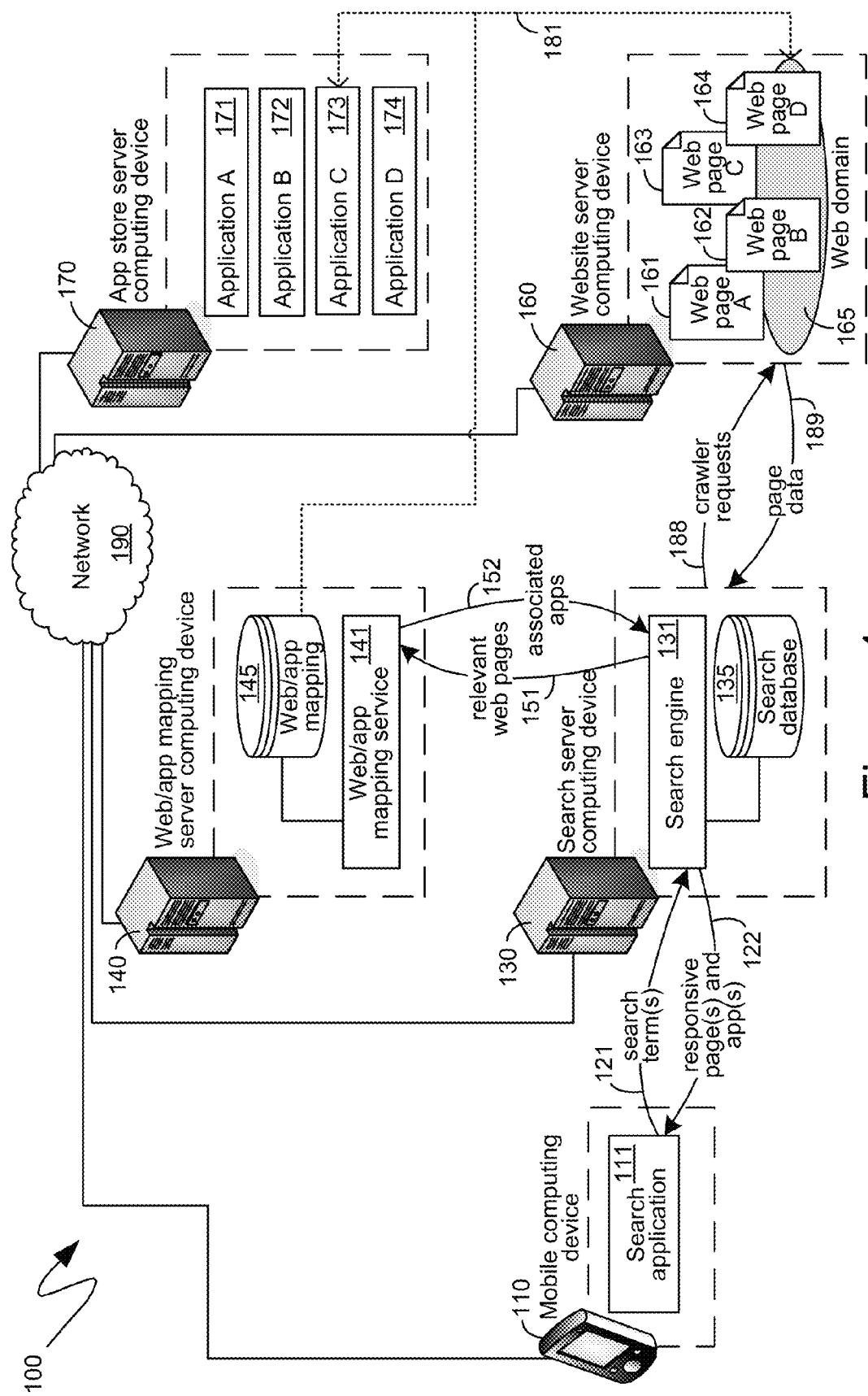
FIG. 1 is a block diagram of an exemplary network of computing devices implementing a bidirectional network-content-to-application mapping.

The following description relates to the provision of network content associated with an identified application, and the provision of applications associated with identified network content, to entities cognizant of one but not the other. A bidirectional mapping can be established between network content, such as network content organized in the form of websites, and application programs, such as dedicated applications executing on an operating system platform typically executed on mobile computing devices. Such a bidirectional mapping can be based on declarations at both the network content, such as in the form of extensible markup language content or metadata tags, and at the dedicated application, such as in the form of a manifest. Additionally, bidirectional mapping can provide for deep links which can associate specific network content, such as a specific webpage, with a specific presentation of data in an application program, such as a specific screen of the application program. The identification format for such deep links can conform to a predetermined standard, such as by utilizing the same identifier, except with a different protocol specifier, for both the specific network content and the specific presentation of data in the application program. Alternatively, the identification format for such deep links can be custom implemented according to a defined format that can be declared either as part of the network content or as part of the application program. The bidirectional mapping can then be utilized by a lookup service to provide functionality to a third-party entity that neither provides the network content nor the application programs. Such a third-party entity to be cognizant of one, but not the other, can utilize the lookup service to address such a deficiency. The lookup service can identify, to the entity utilizing such a service, application programs associated with network content specified by that entity and network content associated with application programs specified by that entity. In such a manner, entities cognizant of application programs can learn of associated network content, and entities cognizant of network content can learn of associated application programs.

For purposes of illustration, the techniques described herein make reference to existing and known networking infrastructure, such as the ubiquitous Internet and World Wide Web (WWW). Also for purposes of illustration, the techniques described herein make reference to existing and known protocols and languages, such as the ubiquitous HyperText Transfer Protocol (HTTP) and the equally ubiquitous HyperText Markup Language (HTML). Such references, however, are strictly exemplary and are not intended to limit the mechanisms described to the specific examples provided. Indeed, the techniques described are applicable to any network information provided through any sort of network communication protocols. Similarly, for purposes of illustration, the techniques described herein will be presented within the context of application programs executing on a mobile computing device, such as application programs designed to execute on operating systems typically implemented by mobile computing devices. Again, such references are strictly exemplary and are not intended to limit the mechanisms described to the specific examples provided. Indeed, the techniques described are applicable to any application executing on any type of computing device and operating system platform.

Although not required, the description below will be in the general context of computer-executable instructions, such as program modules, being executed by a computing device. More specifically, the description will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including hand-held devices, multi-processor systems, microprocessor based or programmable consumer electronics, network PCs, minicomputers, mainframe computers, and the like. Similarly, the computing devices need not be limited to stand-alone computing devices, as the mechanisms may also be practiced in distributed computing environments where tasks are performed by remote processing devices that are linked through a communications network. In a distributed computing environment, program modules may be located in both local and remote memory storage devices.

Turning to FIG. 1, an exemplary system 100 is shown, comprising a mobile computing device 110 that is communicationally coupled to both an app store server computing device 170, from which the mobile computing device 110 can obtain one or more application programs that can execute on the mobile computing device 110, and a website server computing device 160 that can comprise a web domain 165 that can be accessed by the mobile computing device 110, such as, for example, by a web browser application program executing on the mobile computing device. The exemplary system 100 can further comprise a search server computing device 130 with which the mobile computing device 110 can communicate in order to search for network content, such as that hosted by the website server computing device 160, that may be relevant to the interests of the user of the mobile computing device 110. The exemplary system 100 can also comprise a web/app mapping server computing device 140 whose operation will be described in greater detail below. The mobile computing device 110, and various server computing devices, including the search server computing device 130, the web/app mapping server computing device 140, the website server computing device 160 and the app store server computing device 170 can all be communicationally coupled to one another, and to other computing devices, via a network, such as the network 190.

For purposes of the descriptions below, the mobile computing device 110 will be illustrated as, and referenced as, a mobile computing device, such as, for example, a cellular telephone, a personal digital assistant, a tablet, or other like mobile computing device that is typically communicationally coupled to the network 190 via a wireless connection. Although the mechanisms described in detail below are equally applicable to any type of computing device, it is likely that they will serve the greatest utility within the context of mobile computing devices. In particular, mobile computing devices can most often benefit from the packaging of data in the form of application programs that present such data in a manner most efficiently accessed and consumed by a user of a mobile computing device. And it is such application programs that can most easily be associated with network content, such as the web domain 165, in order to provide the benefits described below.

In one embodiment, a user of a mobile computing device, such as the mobile computing device 110, can execute thereon a search application 111 that can communicate with a search engine 131 being hosted by the search server computing device 130. The search application 111, which can be nothing more than a web browser, or which can be a dedicated search application, can provide search terms 121 to the search engine 131. In response, and as will be recognized by those skilled in the art, the search engine 131 can reference a search database 135 to identify one or more collections of network content, such as one or more webpages, that can be responsive to the search terms 121. Such responsive webpages can then be returned, by the search engine 131, to the search application 111, such as via the communication 122. For example, the search engine 131, with reference to the search database 135, can determine that one or more of the webpages 161, 162, 163 or 164 of the web domain 165 are relevant to the search terms 121 and can identify those webpages in the responsive communication 122.

As indicated, the search engine 131 can utilize the search database 135 to identify those webpages that are relevant to the search terms 121 that were provided. The search database 135, as will be recognized by those skilled in the art, can be generated based on information collected from webpages, such as the webpages 161, 162, 163 and 164, from a crawler, that is not specifically illustrated in FIG. 1, but which can execute on the server computing devices associated with the search server computing device and can send crawler requests 188 to server computing devices hosting webpages, such as the website server computing device 160, and received therefrom the webpage data 189. Such a crawler, however, does not typically crawl app store server computing devices, such as the app store server computing device 170, or, if it does so, collects only a minimum amount of data such as, for example, the data specified and application's manifest. Consequently, the search engine 131 can respond to the search application 111 with an identification of one or more collections of network content, such as one or more of the webpages being hosted by the website server computing device 160, but may not necessarily respond with an identification of one or more applications, such as the applications 171, 172, 173 and 174, that may also be relevant to the user's search terms 121.

In one embodiment, to enable entities, such as the search engine 131, to utilize existing knowledge, such as the search database 135 comprising information regarding network content, a web/app mapping server computing device 140 can host a web/mapping service 141 that can provide a mapping between such existing knowledge and new information that may also be relevant to such entities. For example, in the specific embodiments described above and illustrated by the system 100 of FIG. 1, the search engine 131, together with the search database 135, can comprise information regarding network content, such as that of the web domain 165, but may not necessarily comprise an equivalent amount of information regarding application programs, nor of data that they may access over the network 190 through protocols, or from locations, that are exclusively utilized by, or known to, such application programs. Consequently, the search engine 131 can reference the search database 135 to identify network content, such as that of the web domain 165, that is responsive to a user's search terms 121, but it may not be able to similarly identify applications that may be similarly responsive to the user's search terms 121, or which may have exclusive access to other network content that may be responsive to the user's search terms 121. In one embodiment, therefore, the search engine 131 can provide indication of the network content, such as the webpages, that it has identified as being responsive to the web/app mapping service 141, as illustrated by the communication 151. In response, the search engine 131 can receive indication of applications associated with those webpages, which the search engine 131 can then communicate to the search application 111 as part of the responsive communication 122. In a similar manner, although not specifically illustrated by the system 100 of FIG. 1, another entity could contact the web/mapping service 141 with an identification of one or more application programs and can receive, in response, an identification of one or more collections of network content, such as one or more webpages or one or more web domains, that are associated with those application programs. To provide such functionality, the web/app mapping service 141 can reference a web/app mapping database 145 which can be populated and maintained in the manner described in detail below.

For ease of reference, the term "web/app mapping" is utilized herein to mean either a single direction or bidirectional mapping between application programs that can execute on computing devices and collections of network content, of which webpages and web domains are two examples.

Figure 2:
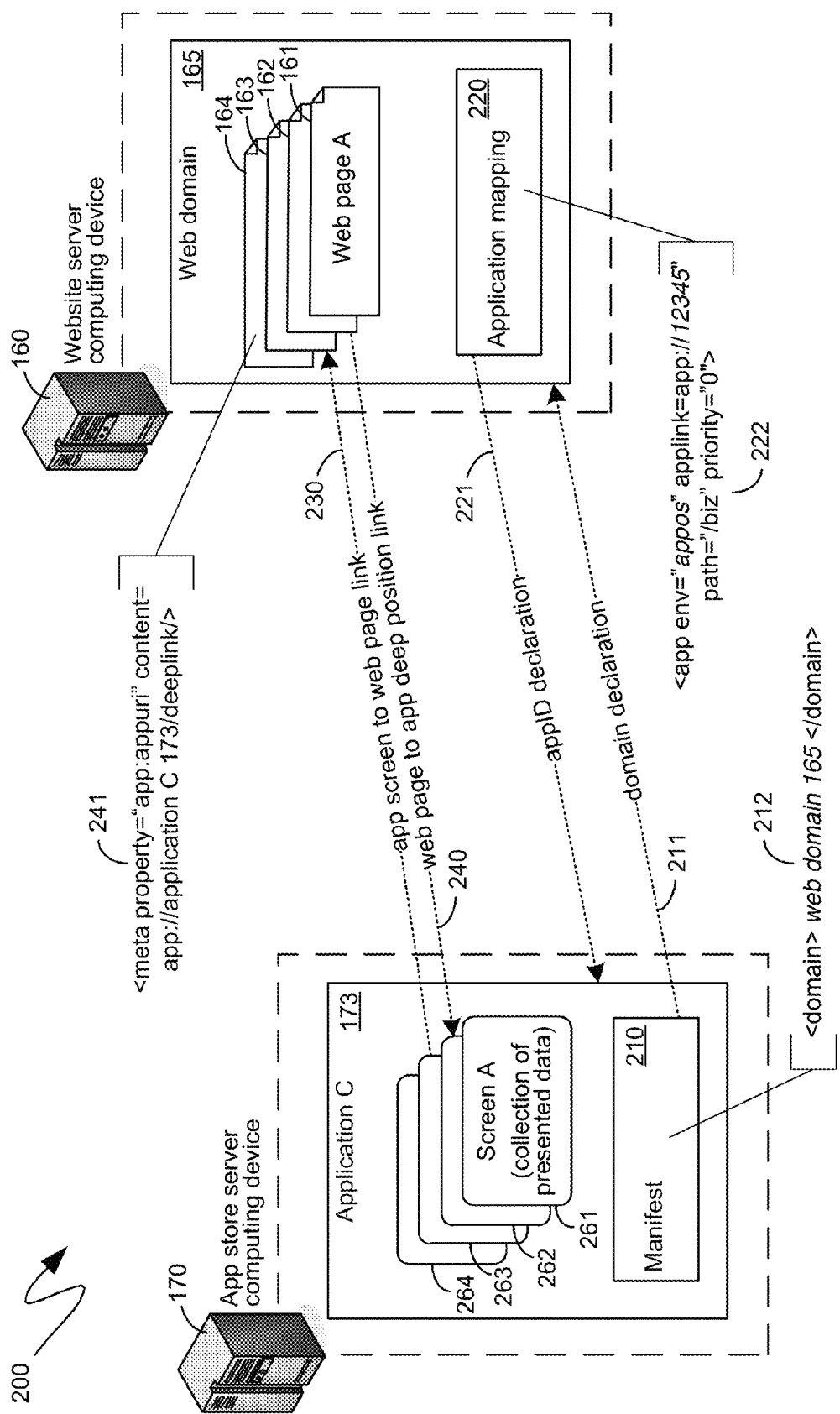
FIG. 2 is a block diagram of an exemplary network content hosting computing device and an exemplary application hosting computing device implementing a bidirectional network-content-to-application mapping.

Turning to FIG. 2, the system 200 shown therein illustrates aspects of an application program and a web domain, including individual webpages, relevant to the establishing and maintenance of mapping between network content and application programs. In particular, the system 200 of FIG. 2 illustrates a app store server computing device, such as the app store server computing device 170 shown in FIG. 1, and a website server computing device, such as the website server computing device 160 that was also shown in the system 100 of FIG. 1. The app store server computing device 170 can comprise an exemplary application 173, that can be made available, by the app store server computing device 170, for download, installation and utilization by other computing devices that are communicationally coupled thereto. The website server computing device 160 can comprise the web domain 165 comprising the webpages 161, 162, 163 and 164 that were illustrated previously in FIG. 1. For purposes of description and explanation, the exemplary application 173, shown in the system 200 of FIG. 2, can be associated with the web domain 165 that is also part of the system 200. For example, the web domain 165 can comprise a website of a restaurant and the application 173 can comprise a restaurant guide application. As another example, the application 173 can comprise a retail establishment application for guiding users to locations of such a retail establishment, enabling users to purchase items from such a retail establishment, and the web domain 165 can comprise an online presence of that same retail establishment.

In one embodiment, an application, such as the exemplary application 173, can comprise a manifest, such as the manifest 210 that can comprise a domain declaration 211 identifying the web domain 165. Analogously, the web domain 165 can comprise an application mapping document, such as an extensible markup language document, that can provide a corresponding application identification declaration 221 identifying the exemplary application 173. Based on such a two-way binding a web/map mapping can be established between the exemplary application 173 and the web domain 165.

The domain declaration 211, in the manifest 210 of the exemplary application 173, can identify the web domain 165 through any sort of declarative statement. As one example, an extensible markup language statement 212 can be part of the manifest 210 and can identify the web domain 165, such as via the use of defined "<domain>" tags. As another example, although not specifically illustrated by the system 200 of FIG. 2, the manifest 210 can comprise a declarative statement by which an identification of the web domain 165 is stored in the appropriate domain variable. Other similar declarations can likewise be utilized, as will be understood by those skilled in the art.

Similarly, the application identifying declaration 221 of the application mapping document 220 that can be part of the web domain 165, can, similarly, identify the exemplary application 173 through any sort of declarative statement. As one example, an extensible markup language statement 222 can be part of the application mapping document 220 and can identify, for example, an application identifier, such as in the form of the statement "applink=app://12345", where, in the illustrated example, the identifier of the exemplary application 173 is the identifier "12345". In the exemplary markup language statement 222, additional information can be provided such as, for example, an environment in which the specified application can execute, a path to the specified application, a priority of the specified application, and other like information. As another example, the application mapping documents 220 could comprise programmatic or script-based declarations. Other similar declarations can likewise be utilized, as will also be understood by those skilled in the art. In one embodiment, the application mapping document 220 can be at the root level of the web domain 165, while in other embodiments the application mapping document can be stored in an appropriate hierarchical location, such as a pre-defined location.

In one embodiment, rather than merely identifying a linking between an application, such as the exemplary application 173, and a collection of network content, such as the web domain 165, deep linking mechanisms can be utilized whereby individual portions of network content, such as individual webpages, can be associated with discrete informational presentation quanta generated by the application, such as, for example, screens of content presented by the application to a user of the computing device on which the application is executed. For simplicity, the descriptions below will utilize the term "screen" to refer to a quantum of information as it would be presented to a user of the application, and not necessarily a specific graphical construct.

To provide for deep linking mechanisms, individual webpages, such as the exemplary webpages 161, 162, 163 and 164, can comprise a web page to application deep position link 240 that can identify corresponding screens of the exemplary application 173, such as the screens 261, 262, 263 and 264. Although the exemplary application 173 is illustrated as having screens corresponding to each of the webpages in the web domain 165, no such one-to-one correspondence is required, and only specific webpages can identify one or more screens of exemplary application 173. In one embodiment, the web page to application deep position link 240 can be in the form of meta-tags, or other metadata that is part of each individual webpage comprising such a link. One such exemplary meta-tag 241 is illustrated by the system 200 of FIG. 2. The exemplary meta-tag 241 can comprise a "property" variable and a "content" variable, the latter of which can provide a Universal Resource Identifier (URI) that can identify a particular screen of the exemplary application 173, such as one of the screens 261, 262, 263 and 264.

In one embodiment, the URI of application screens can be equivalent to the URI of the individual webpages associated with those screens, except that the protocol identifier, such as "http://" can be replaced with a protocol identifier identifying such URIs as those of application screens. For example one such protocol identifier can be "app://". In such an embodiment, a webpage having an address of "http://www.someplace.com/example" can be associated with an application screen whose URI would, in the present embodiment, be "app://www.someplace.com/example". In such an embodiment, it can be up to the developer of the application, such as the exemplary application 173, to be able to receive such URIs and associate them with appropriate screens of the application. For example, a developer of an application associated with the exemplary "www.someplace.com" domain can provide for such an application to be able to receive a URI in the form of "app://www.someplace.com/example" and recognize such a URI as an identifier of a specific screen of such an application.

In such an embodiment, a link 230 from an application screen to a specific webpage can operate in the equivalent manner. For example, a developer of an application associated with the exemplary "www.someplace.com" domain can provide for such an application to be associated with a URI of "app://www.someplace.com/example" with a particular screen of such an application. The corresponding web page, which can be referenced by the application screen to a specific webpage link 230 can be generated by replacing the "app://" protocol identifier with the "http://" protocol identifier, resulting in a link to the web page "http://www.someplace.com/example".

In another embodiment, however, application developers can develop and utilize their own identification schemes, into their own constructs for URIs identifying specific screens of an application. In such an embodiment, the application mapping document 220, the manifest 210, or some combination thereof can identify the manner in which such a deep linking association is to be generated, or can identify specific deep links, such as specific associations between specific screens of an application program and specific webpages of an associated webpage domain. Additionally, in such an embodiment, meta-tags need not be present on each individual webpage, since the relevant information to be part of the application mapping document 220. As one example of the defining of deep link URIs in, for example, an application mapping document, the URIs defined by an application developer can include variable specifiers as part of the URI, and the application mapping document 220, the manifest 210, or some combination thereof can identify the variable specifiers that can be used, or, at least, identify the manner in which such variable specifiers are to be utilized.

Figure 3:
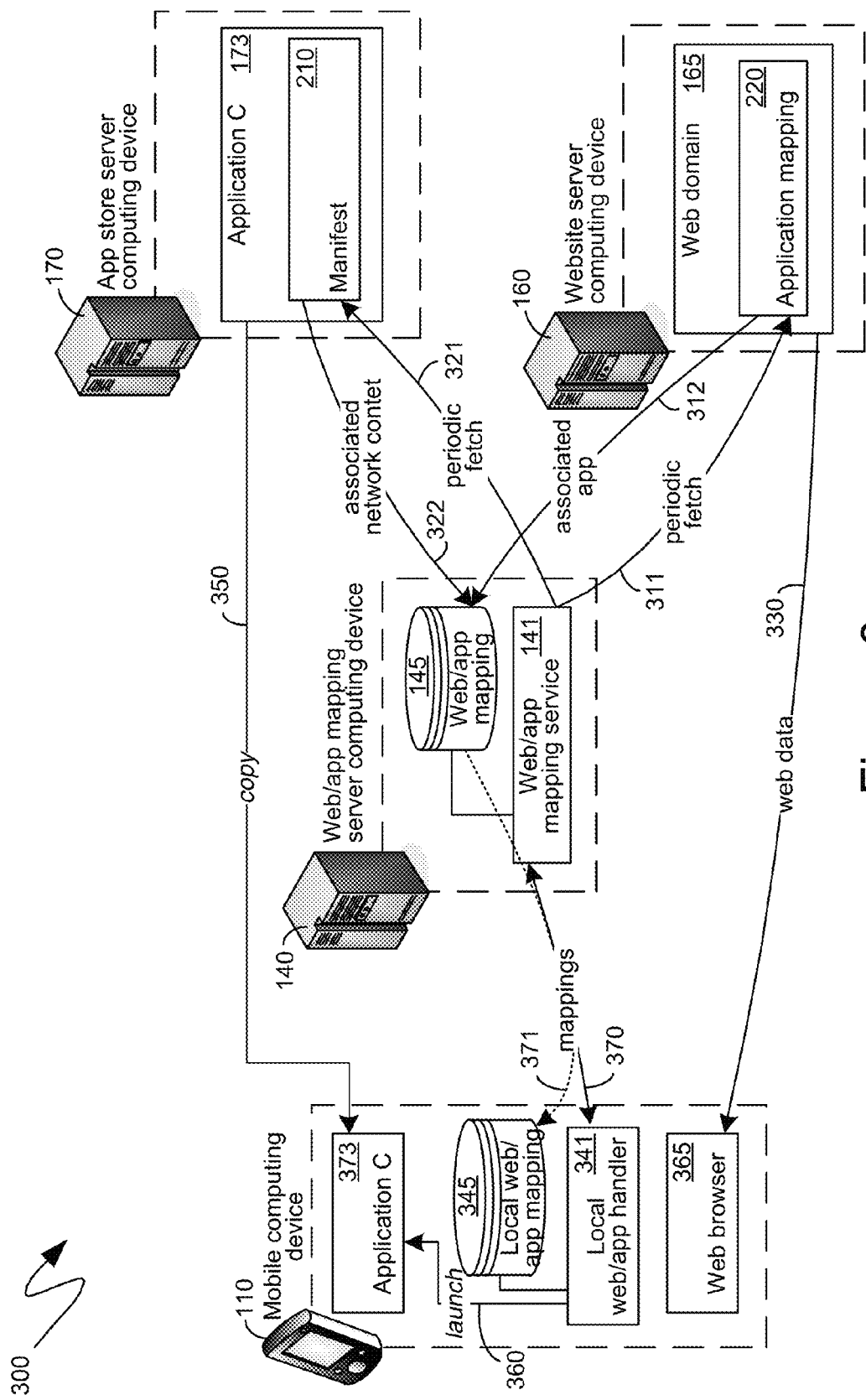
FIG. 3 is a block diagram of an exemplary network of computing devices utilizing a bidirectional network-content-to-application mapping.

Turning to FIG. 3, the system 300 shown therein illustrates an exemplary operation of a web/app mapping server computing device, such as the exemplary web/app mapping server computing device 140, in the context of the exemplary application 173, comprising the manifest 210, and the web domain 165, comprising application mapping document 220, which were described in detail above with reference to the system 200 of FIG. 2. In one embodiment, the web/mapping service 141 that can execute on the web/app mapping server computing device 140 can perform a periodic fetch 311 to obtain information from application mapping documents of web domains, such as the application mapping document 220 of the web domain 165. As will be recognized by those skilled in the art, such a periodic fetch 311 can be performed in a manner analogous to that currently utilized by search engine crawlers, which can revisit most of the network content available at least once every couple of weeks. Consequently, the periodic fetch 311 can be directed to the web domain 165 as part of a periodic fetch cycling through most or all of the web domains accessible to the web/app mapping service 141.

In response to the periodic fetch 311, the web domain 165 can provide the application mapping document 220 from which the web/mapping service 141 can obtain information regarding associate application, and can store such an association between the web domain 165 and the associated application 173 in the web/app mapping database 145, as illustrated by the communication 312. In such a manner, the web/app mapping service 141 can cycle through known web domains and can obtain therefrom mappings between those web domains in one or more applications, which can be stored in the web/mapping database 145.

In another embodiment, in addition to, or as an alternative to, the periodic communications directed to various web domains, such as the periodic fetch 311, the web/app mapping service 141 can perform periodic fetches of manifests of applications that are uploaded to an app store, such as that implemented by the app store server computing device 170. For example, as illustrated by the system 300 of FIG. 3, the web/app mapping service 141 can perform a periodic fetch 321 of the manifest 210 associated with the exemplary application 173, which can be one of the applications available for download from the app store server computing device 170. As with the periodic fetch 311, in one embodiment, the periodic fetch 321 can be part of a periodic fetch directed to each of the applications available from the app store server computing device 170. In an alternative embodiment, however, the periodic fetch 321 can be a targeted fetch directed to specific applications that can, for example, have been identified, such as by processes executing in the app store server computing device 170, as newly uploaded applications. In such another embodiment, information regarding such newly uploaded applications can be communicated to the web/app mapping service 141 to enable the web/app mapping service 141 to target the periodic fetches 321 to specific ones of the application programs, such as those newly uploaded to, or made available from, the app store server computing device 170.

As with the periodic fetch 311, the periodic fetch 321 can obtain from manifests, such as the manifest 210, information regarding network content that is associated with the application 173, as identified by the manifest 210. Such associated network content information can be stored by the web/mapping service 141 in the web/app mapping database 145, as illustrated by the communication 322.

The mapping between network content and applications, as indicated previously, need not be a one-to-one mapping. Consequently, multiple applications can be mapped to a single collection of network content and, conversely, multiple collections of network content can be mapped to a single application. In one embodiment, mappings can be ranked in accordance with various criteria such as, for example, the amount of clicks or other indicia of user interest directed at either a collection of network content or a single application. As another example, the quantity of inbound links to a collection of network content can, likewise, be utilized to rank mappings. Thus, if two collections of network content are mapped with a single application, the mapping between the application and the first collection of network content can be rated higher than the mapping between the application and the second collection of network content if, for example, the first collection of network content experiences a greater volume of user traffic or, as another example, has a greater quantity of inbound links directed to it.

In one embodiment, individual, personal computing devices, such as the exemplary mobile computing device 110, can comprise their own copies of the web/app mapping database 145, such as in the form of the local web/app mapping database 345. Additionally, such personal computing devices can further comprise local web/app handlers, such as exemplary local web/app handler 341 that can execute on such computing devices and provide functionality by which entities that are not associated with either the web domain 165 nor the application 173 can utilize the association between them to provide a more complete depiction of available information. For example, executing on the mobile computing device 110 can be a web browser 365. As initially described in detail above in connection with the system 100 of FIG. 1, the web browser 365 can access a search website to enable the user of the mobile computing device 110 to search for information relevant to that user's interests. Such a search website can return a list of webpages that can be relevant to the search query entered by the user, including, for example, one or more webpages from the web domain 165. The web browser 365 can then communicate with the website server computing device 160 to obtain therefrom web data 330 in order to display those webpages on the mobile computing device 110. As indicated previously, the web domain 165 can be associated with an application, such as the exemplary application 173. However, as also indicated previously, a search website may not have knowledge of the application 173 or, indeed, any application on the app store server computing device 170. Thus, in such a context the web/mapping can be utilized to identify applications that are associated with webpages, or web domains, that have already been identified utilizing existing mechanisms, such as the existing search technology being implemented by the search website.

For example, in one embodiment, the web browser 365 to communicate with the local web/app handler 341 on the mobile computing device 110 and can provide, to the local web/Handler 341, an indication of one or more webpages, or web domains, which the web browser 365 has received as a response to, for example, a user query on a search website. The local web/app handler 341 can then reference the local web/app mapping database 345 and identify those applications, such as the exemplary application 173, that are associated with the webpages, or web domains, identified by the web browser 365. Since existing mechanisms have identified those webpages, or web domains, as being relevant, associated applications, as identified by the web/app mapping provided by the local web/app handler 341 and the local web/app mapping database 345, can, by definition, also be relevant.

In one embodiment, if an identified application is already installed on the mobile computing device 110, the local web/app handler 341 can invoke such an application, should the user request its invocation. In another embodiment, if an identified application is not already installed on the mobile computing device 110, it can be downloaded to the mobile computing device 110, from the app store server computing device 170, such as is illustrated by the copy action 350. Subsequently, it can be invoked, either by the user directly, or through mechanisms provided by the local web/app handler 341.

To initially obtain, and subsequently maintain, the mappings in the local web/app mapping database 345, the local web/app handler 341 can communicate with the web/app mapping service 141, which executes on the web/app mapping server computing device 140, as illustrated by the communication 370. In such a manner, mappings stored in the web/app mapping database 145, which can have been generated based on the mechanisms described in detail above, can be communicated to the local web/app mapping database 345, as illustrated by the dashed line 371.

Figure 4:
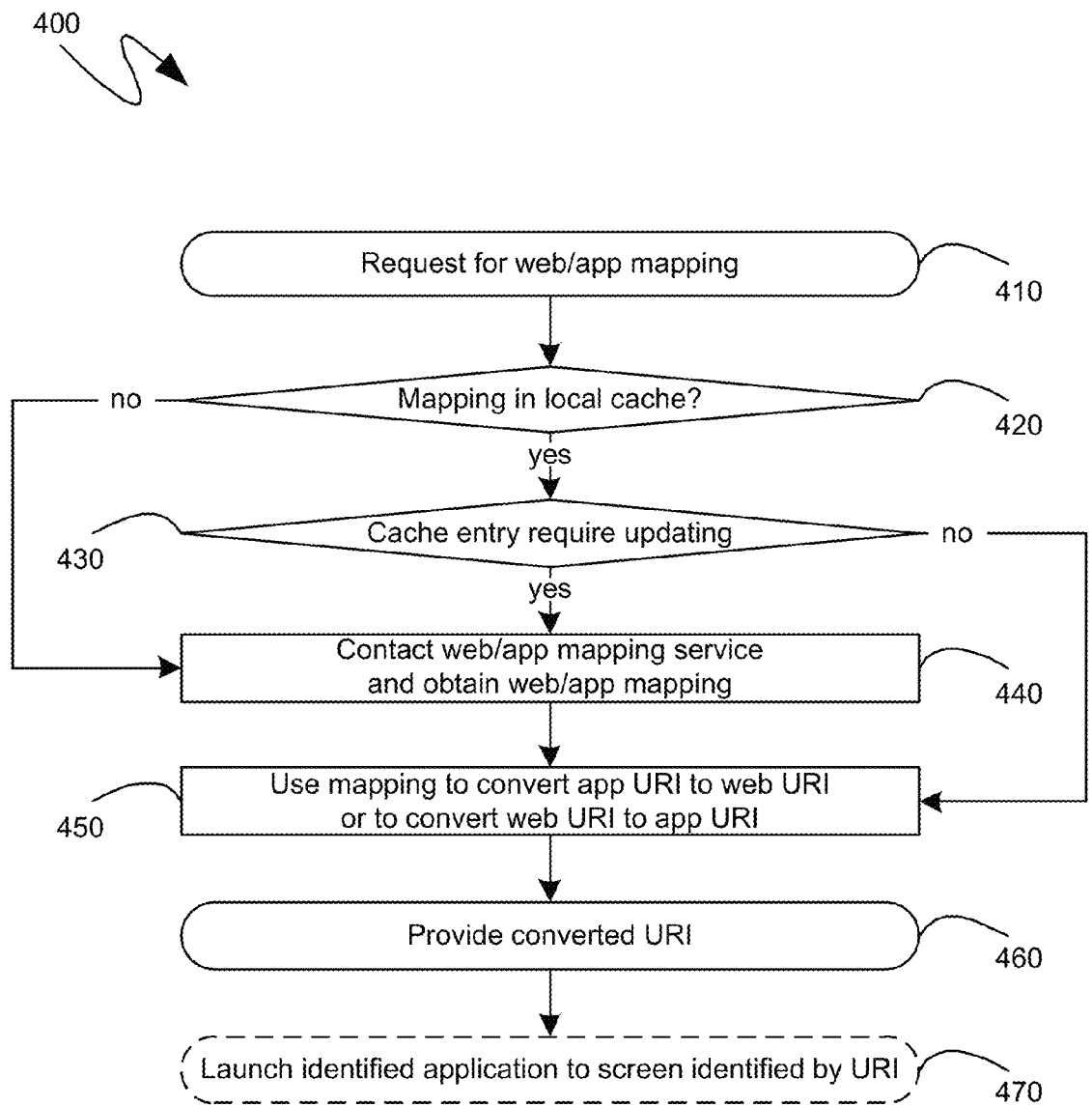
FIG. 4 is a flow diagram of an exemplary operation of a lookup service utilizing a bidirectional network-content-to-application mapping.

Turning to FIG. 4, the flow diagram 400 shown therein illustrates an exemplary series of steps that can be performed by a web/app mapping component, such as the local web/app handler 341 that was illustrated in FIG. 3. Initially, at step 410, a request for web/app mapping can be received. As indicated previously, such a request can be a presentation of the network content, such as websites or web domains, for which associated applications are to be provided, or it can be a presentation of identifying applications for which associated network content is to be provided. In such a manner, existing mechanisms cognizant of one, namely either the network content, or the applications, and learn of associated aspects of the other, and can, thereby, provide a greater breadth of information to the user.

Once a request is received, at step 410, processing can proceed to step 420 where a local cache can be referenced to determine whether any mappings between applications and network content exist that are relevant to the request. One such local cache can be the local web/app mapping database 345, which was also illustrated in FIG. 3. If, at step 420, it is determined that relevant mappings are in the local cache, processing can proceed to step 430 at which point each of the relevant entries can be checked to determine whether they require updating. In particular, in one embodiment, one or more entries in a web/app mapping database can include information specifying for how long such entries are valid. As will be recognized by those skilled in the art, such information is often referred to as "time to live" data such that, after the specified time is expired, the mapping is considered to be "stale" or no longer valid and an update can be performed. In such an embodiment, if, at step 430, it is determined that the entries in the web/app mapping database, which are relevant to the request received at step 410, do not require updating, then processing can proceed with step 450.

At step 450, the identified entries in the web/app mapping database can be utilized to identify associated network content, or applications, whichever was not specified in the request received at step 410. Thus, for example, if the request received at step 410 specified network content, then, at step 450, the identified entries in the web/app mapping database can be utilized to identify applications associated with the specified network content and identifiers of those applications can be provided at step 460. As another example, if the request received at step 410 specified applications then, at step 450, the identified entries in the web/app mapping database can be utilized to identify network content associated with the specified applications and identifiers of such network content can be provided at step 460.

Optionally, at step 470, if one or more applications are identified at step 460, those applications can be launched at step 470 such that they open to the screen identified by the URI associated with the network content that was provided at step 410. In one embodiment, prior to the performance of step 470, a check can be made whether the application identified can be invoked from a URI from a different domain. If such an application cannot be invoked from a URI from a different domain, then step 470 can proceed only if the domain declared by such an application is the same as the domain of network content received at step 410.

Returning back to step 420, if, at step 420, no relevant mappings between applications and network content are found in the local cache or, if, at step 430, relevant mappings that were found require updating, then processing can proceed to step 440 at which point a networked web/app mapping service can be contacted to determine whether it contains relevant mappings between applications and network content, and to determine whether it contains a newer version of any existing mappings that were identified but that require updating.

Figure 5:
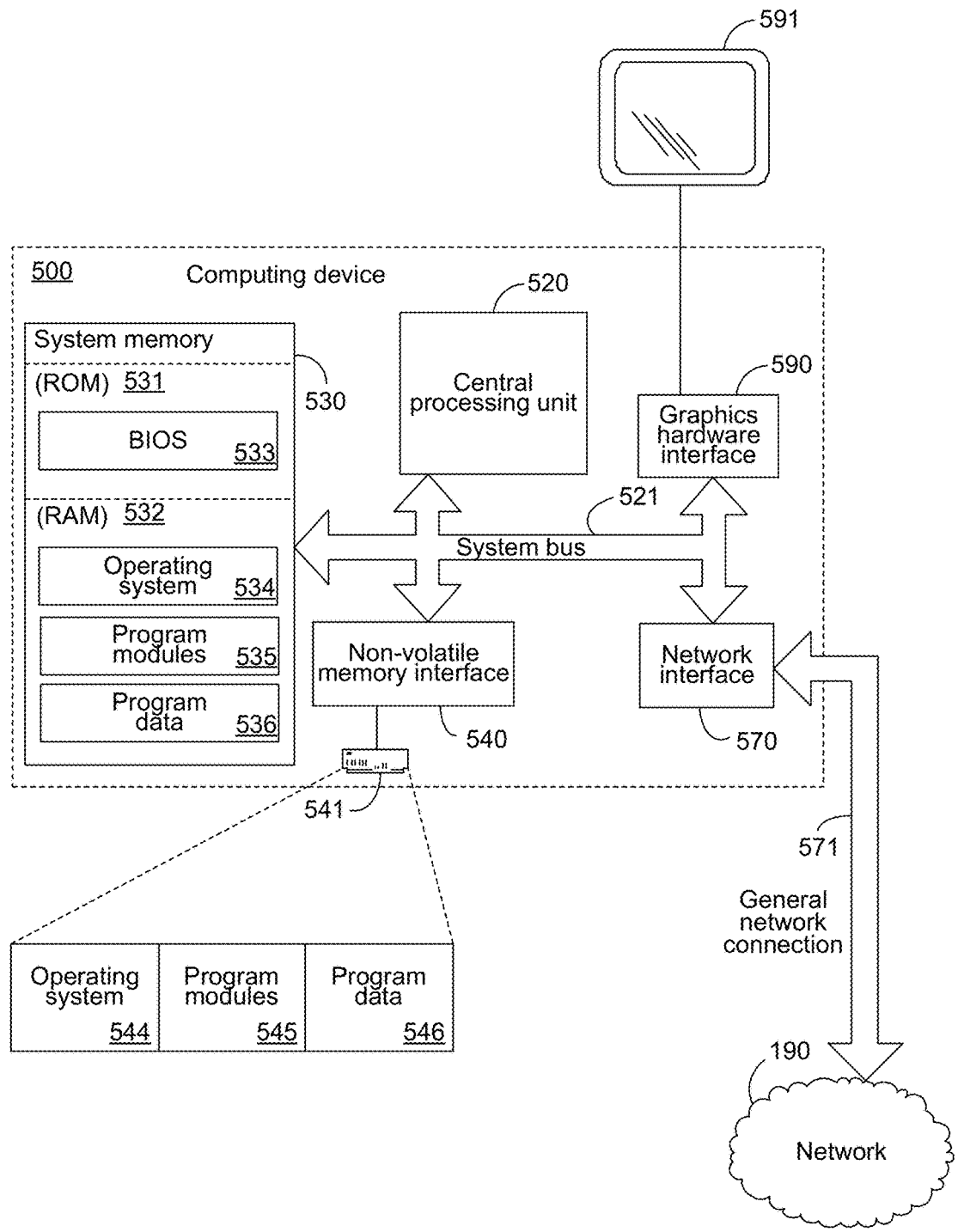
FIG. 5 is a block diagram of an exemplary computing device.

Turning to FIG. 5, an exemplary computing device 500 is illustrated. The exemplary computing device 500 can be any one or more of the mobile computing device 110 and the server computing devices 130, 140, 160 and 170 illustrated in FIGS. 1 through 3, whose operations were described in detail above. For example, the computing device 500 can be a cellular telephone, personal digital assistant, tablet computing device or other like mobile computing device. Similarly, the exemplary computing device 500 can be a server computing device or a computing device that can be executing one or more processes that can represent the server computing devices 150 and 170 illustrated in FIG. 1, such as, for example, by executing one or more processes that create virtual computing environments that can provide for the operations detailed above. The exemplary computing device 500 of FIG. 5 can include, but is not limited to, one or more central processing units (CPUs) 520, a system memory 530, that can include RAM 532, and a system bus 521 that couples various system components including the system memory to the processing unit 520. The system bus 521 may be any of several types of bus structures including a memory bus or memory controller, a peripheral bus, and a local bus using any of a variety of bus architectures. The computing device 500 can optionally include graphics hardware, such as for the display of visual user interfaces, including, but not limited to, a graphics hardware interface 590 and a display device 591. Depending on the specific physical implementation, one or more of the CPUs 520, the system memory 530 and other components of the computing device 500 can be physically co-located, such as on a single chip. In such a case, some or all of the system bus 521 can be nothing more than silicon pathways within a single chip structure and its illustration in FIG. 5 can be nothing more than notational convenience for the purpose of illustration.

The computing device 500 also typically includes computer readable media, which can include any available media that can be accessed by computing device 500 and includes both volatile and nonvolatile media and removable and non-removable media. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 500. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 530 includes computer storage media in the form of volatile and/or nonvolatile memory such as read only memory (ROM) 531 and the aforementioned RAM 532. A basic input/output system 533 (BIOS), containing the basic routines that help to transfer information between elements within computing device 500, such as during start-up, is typically stored in ROM 531. RAM 532 typically contains data and/or program modules that are immediately accessible to and/or presently being operated on by processing unit 520. By way of example, and not limitation, FIG. 5 illustrates the operating system 534 along with other program modules 535, and program data 536.

The computing device 500 may also include other removable/non-removable, volatile/nonvolatile computer storage media. By way of example only, FIG. 5 illustrates the hard disk drive 541 that reads from or writes to non-removable, nonvolatile media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and the like. The hard disk drive 541 is typically connected to the system bus 521 through a non-removable memory interface such as interface 540.

The drives and their associated computer storage media discussed above and illustrated in FIG. 5, provide storage of computer readable instructions, data structures, program modules and other data for the computing device 500. In FIG. 5, for example, hard disk drive 541 is illustrated as storing operating system 544, other program modules 545, and program data 546. Note that these components can either be the same as or different from operating system 534, other program modules 535 and program data 536. Operating system 544, other program modules 545 and program data 546 are given different numbers hereto illustrate that, at a minimum, they are different copies.

The computing device 500 can operate in a networked environment using logical connections to one or more remote computers. The computing device 500 is illustrated as being connected to the general network connection 571 through a network interface or adapter 570, which is, in turn, connected to the system bus 521. In a networked environment, program modules depicted relative to the computing device 500, or portions or peripherals thereof, may be stored in the memory of one or more other computing devices that are communicatively coupled to the computing device 500 through the general network connection 571. It will be appreciated that the network connections shown are exemplary and other means of establishing a communications link between computing devices may be used.

As can be seen from the above descriptions, mechanisms for associating network content with applications have been enumerated. In view of the many possible variations of the subject matter described herein, we claim as our invention all such embodiments as may come within the scope of the following claims and equivalents thereto.

We claim:

1. A computing device comprising:
one or more processing units; and
one or more computer-readable storage media comprising computer-executable instructions, which, when executed by the processing units, cause the computing device to:
obtain, from network content, an application mapping document identifying one or more applications;
obtain, from one or more applications, a manifest identifying one or more collections of network content;
generate a first mapping between a first collection of network content and a first application if both the first application comprises a manifest identifying the first collection of network content and if the first collection of network content comprises an application mapping document identifying the first application; and
periodically repeating the obtaining the application mapping document and the obtaining the manifest.

2. The computing device of claim 1, wherein the computer-readable storage media comprise further computer-executable instructions, which, when executed by the one or more processing units, cause the computing device to: obtain, from individual pages of the network content, an identification of one or more specific screens of the one or more applications specified by the application mapping document; and generate a second mapping between a first individual page of the first collection of network content and a first screen of the first application if the first individual page of the network content comprises an identification of the first screen.

3. The computing device of claim 2, wherein the first screen of the first application is identified by a first screen URI that is identical to a first individual page URI except for differences in a protocol identifier.

4. The computing device of claim 2, wherein the first screen of the first application is identified by a first screen URI that conforms to a URI convention identified by at least one of the application mapping document identifying the first application and the manifest identifying the first collection of network content.

5. The computing device of claim 1, wherein the computer-readable storage media comprise further computer-executable instructions, which, when executed by the one or more processing units, cause the ting device to: obtain, from one or more specific screens of the one or more applications specified by the application mapping document, an identification of individual pages of the network content; and generate a second mapping between a first individual page of the first collection of network content and a first screen of the first application if the first individual page of the network content comprises an identification of the first screen.

6. The computing device of claim 1, wherein the obtaining the manifest identifying the one or more collections of network content from the one or more application is performed in response to a notification identifying the one or more applications as applications that have been uploaded since a prior obtaining was performed.

7. The computing device of claim 1, wherein the computer-readable storage media comprise further computer-executable instructions, which, when executed by the one or more processing units, cause the computing device to: rank the first mapping among other mappings of the first collection of network content or the first application based on at least one of: a quantity of inbound links directed to the first collection of network content or the first application and a quantity of clicks directed to the first collection of network content or the first application.

8. A computing device comprising:
one or more processing units; and
one or more computer-readable storage media comprising computer-executable instructions, which, when executed by the one or more processing units, cause the computing device to:

search a local mapping database, if network content was received as input, for mappings specifying one or more applications associated with the network content that was received as input;

search a central mapping database for the mappings specifying one or more applications associated with the network content that was received as input, if the network content was received as input and if no mappings were found by the searching the local mapping database or if the mappings found by the searching the local mapping database had expired;

provide an identification of at least one of the one or more applications associated with the network content that was received as input, if any mappings were found by the searching the local mapping database or the searching the central mapping database;

search a local mapping database, if an application was received as input, for mappings specifying one or more collections of network content associated with the application that was received as input;

search a central mapping database for the mappings specifying one or more collections of network content associated with the application that was received as input, if the application was received as input and if no mappings were found by the searching the local mapping database or if the mappings found by the searching the local mapping database had expired; and provide an identification of at least one of the one or more collections of network content associated with the application that was received as input, if any mappings were found by the searching the local mapping database or the searching the central mapping database.

9. The computing device of claim 8, wherein the computer-readable storage media comprise further computer-executable instructions, which, when executed by the one or more processing units, cause the computing device to: provide an identification of one or more screens of the at least one of the one or more applications if the network content that was received as input was a single page; and provide an identification of one or more pages of the at least one of the one or more collections of network content if the application that was received as input was a single screen.

10. The computing device of claim 8, wherein a screen and a single page are identified by URIs that only differ in a protocol identifier.

11. The computing device of claim 8, wherein the computer-executable instructions which, when executed, cause the computing device to provide the identification of the at least one of the one or more applications associated with the network content that was received as input, comprise computer-executable instructions, which, when executed by the one or more processing units, cause the computing device to: determine a most highly ranked one of the one or more applications associated with the network content that was received as input and provide an identification of the most highly ranked one of the one or more applications; and wherein further the computer-executable instructions which, when executed, cause the computing device to provide the identification of the at least one of the one or more collections of network content associated with the application that was received as input, comprise computer-executable instructions, which, when executed by the one or more processing units, cause the computing device to: determine a most highly ranked one of the one or more collections of network content associated with the application that was received as input and provide an identification of the most highly ranked one of the one or collections of network content.

12. The computing device of claim 8, wherein the computer-readable storage media comprise further computer-executable instructions, which, when executed by the one or more processing units, cause the computing device to: invoke the at least one of the one or more applications associated with the network content that was received as input.

13. The computing device of claim 12, wherein the computer-readable storage media comprising further computer-executable instructions, which, when executed by the one or more processing units, cause the computing device to: check if the at least one of the one or more applications can be invoked from a different domain and only invoking the computer-executable instructions performing the invoking if a URI, though which the at least one of the one or more applications is to be invoked, is in a same domain as the network content that was received as input.

14. A system for identifying applications associated with network content and for identifying the network content associated with the applications, the system comprising:
  a first computer-readable storage device comprising a manifest stored with a first application program, the manifest identifying a first network content associated with the first application program;
  a second computer-readable storage device comprising an application mapping file stored with the first network content, the application mapping document identifying the first application program; and
  a computing device comprising: a local mapping database comprising a mapping between the first network content and the first application program; and further comprising computer-executable instructions for invoking the first application program in response to receiving the first network content.

15. The system of claim 14, further comprising a mapping server computing device comprising computer-executable instructions for: obtaining the application mapping document from the first network content; obtaining the manifest from the first application; generating the mapping between the first network content and the first application; periodically repeating the obtaining the application mapping document and the obtaining the manifest; and providing, to the computing device, the generated mapping.

16. The system of claim 15, wherein the mapping server computing device comprises further computer-executable instructions for: obtaining, from individual pages of the first network content, a identification of one or more specific screens of the first application; and generating a second mapping between a first individual page of the first network content and a first screen of the first application if the first individual page of the network content comprises an identification of the first screen.

17. The system of claim 16, wherein the first screen of the first application is identified by a first screen URI that is identical to a first individual page URI except for differences in a protocol identifier.

18. The system of claim 16, wherein the first screen of the first application is identified by a first screen URI that conforms to a URI convention identified by at least one of the application mapping document of the first network content and the manifest of the first application.

19. The system of claim 15, wherein the obtaining the manifest from the first application is performed in response to a notification identifying the first applications as an application that has been uploaded since a prior obtaining was performed.

20. The system of claim 15, wherein the mapping server computing device comprises further computer-executable instructions for ranking the first mapping among other mappings of the first network content or the first application based on at least one of: a quantity of inbound links directed to the first network content or the first application and a quantity of clicks directed to the first network content or the first application.

\* \* \* \* \*